2,736,578

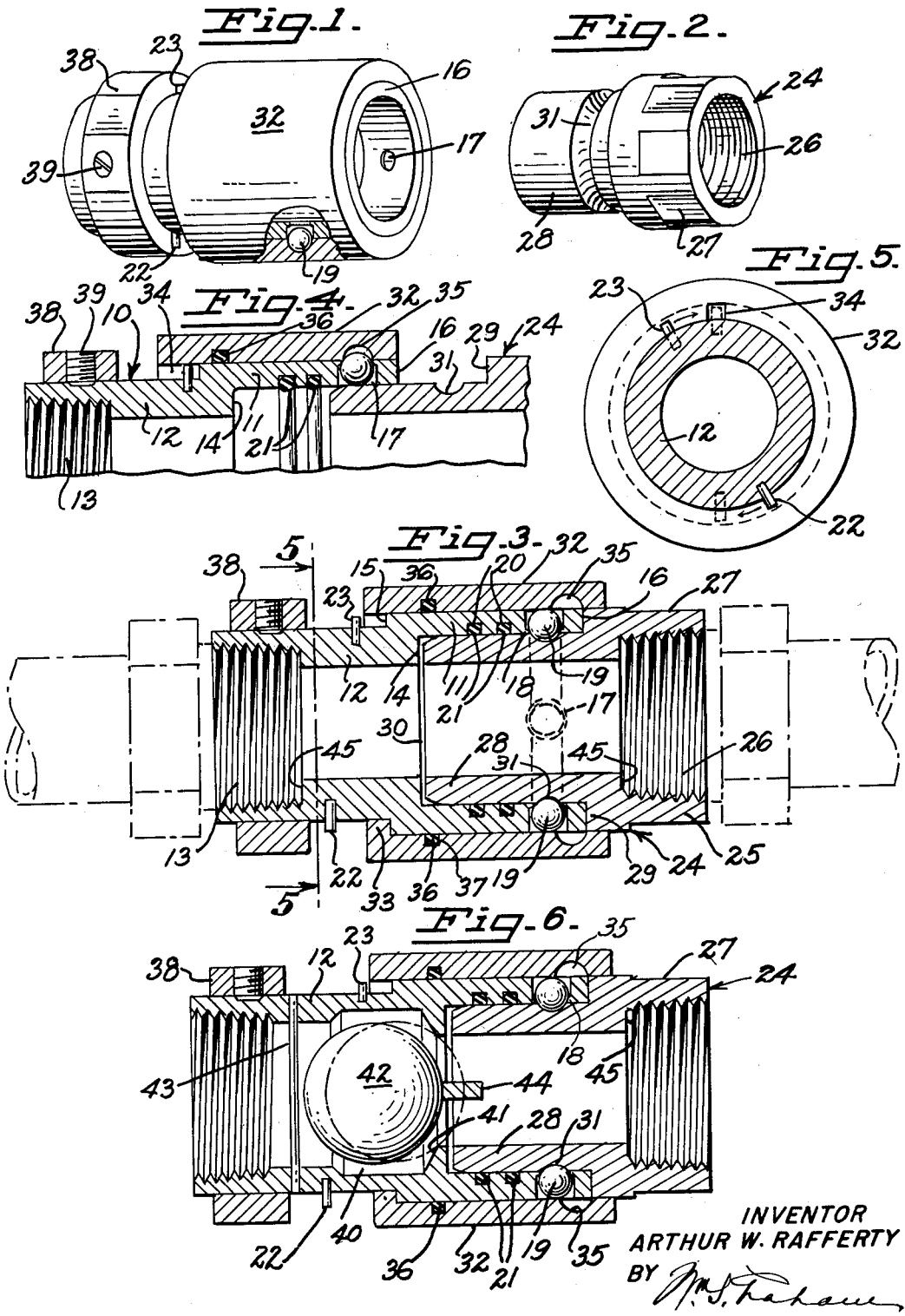
Feb. 28, 1956 A. W. RAFFERTY 2,736,578
ROTATIVE SLEEVE LOCK SWIVEL COUPLER
Filed March 14, 1951
INVENTOR
ARTHUR W. RAFFERTY
BY
ATTORNEY

United States Patent Office 2,736,578
Patented Feb. 28, 1956

ROTATIVE SLEEVE LOCK SWIVEL COUPLER

Arthur W. Rafferty, Sacramento, Calif.

Application March 14, 1951, Serial No. 215,459

2 Claims. (Cl. 285—168)

This invention relates to rotative lock swivel couplings for quick connection and release for advantageous use in fluid conduits either for liquid or gaseous fluids, and more particularly relates to such couplings in which slidable ball bearings serve as a lock means between the members, suitable sealing means being provided.

In many situations where couplings are desired in fluid conduits it is highly desirable that the coupling may be quickly connected and disconnected, and have the facility for rotation of one connected conduit relative to another by swivel action in the coupling, especially when the conduits are under high internal pressure, and that the locking means between the coupled conduits should be rugged, simple and instantly operable, and yet be so constructed as to be operable without tools, while also being provided with sufficient resistance to locking or unlocking operations so that such operation will not occur inadvertently.

Briefly the invention comprises a female tubular body member to one end of which a suitable liquid conduit may be connected, and the opposite end receiving therein a male stub member. Sealing and locking means are provided between said members whereby they may swivel relatively, and an annular sleeve is provided circumferential of the female member, both longitudinally slidable and rotatable thereon for selectively locking and unlocking the said connected members relatively. If desired, there may also be included in the tubular female member a check valve which is automatically opened by insertion of the male stub and automatically closed responsive to line pressure when the coupling is released by withdrawal of the male stub member.

Preferred forms in which the invention may be exemplified are described herein and shown in the accompanying drawing as illustrative of the invention which is defined in the appended claims.

In the drawing:

Fig. 1 is a perspective side view elevation partly broken away, of the female member and locking sleeve in unlocked position, its axis being horizontally disposed.

Fig. 2 is a perspective side view of a complemental male stub member.

Fig. 3 is an enlarged longitudinal central section of the devices of Figs. 1 and 2 in assembled locked relation.

Fig. 4 is a fragmentary longitudinal section of the assembly in Fig. 3, with male and female members partly assembled, but in unlocked relation.

Fig. 5 is a lateral cross section on line 5—5 of Fig. 3 showing various positions of lock pin and stop in.

Fig. 6 is a longitudinal section of an optional modification of the assembly shown in Fig. 3.

Referring to the drawing in which like reference characters indicate corresponding parts in the several views, 10 indicates a tubular female body member generally cylindrical internally and externally, but having two internal and external diameters, its bell or skirt 11 having greater diameter internally and externally than its neck 12, the neck having at one end suitable means, such as threads 13 for connection to a suitable hose or other fluid conduit shown in broken lines in Fig. 3.

Intermediate its ends the female member is provided with an internal annular shoulder 14 and an external shoulder 15 adjacent the juncture of the neck and skirt portions.

Adjacently spaced from its opposite or base end 16, the skirt of the female body member has a plurality of relatively spaced sockets 17, four being exemplified, in circumferential alignment and at 90 degrees spacing, the sockets being perforations having bores of two diameters providing openings through the tubular wall and having a shoulder 18 therein at the bottom of the socket which opens into the inner wall face of the bore of the female member, whereby the outer opening of the socket perforation is of greater diameter than the diameter of the inner opening thereof. Within each of these sockets 17 is mounted a detent ball 19 of greater diameter than the thickness of the wall of the skirt portion 11 of the female body member, so that when the balls are pressed into the sockets 17 flush with the outer face of the tubular wall, they thereby seat on the socket shoulder, and the opposite face portion of the ball extends through the perforation at the inner face of the wall of the bore.

Sealing gasket means are provided between the internal wall of the bore of the female member and a complemental male stub rotatively enclosed therein and to be described. Preferably such means comprises a plurality of relatively axially spaced annular grooves 20 internally of the tubular female skirt member and spaced from and intermediate the internal shoulder 14 and the sockets 17, each groove having mounted therein a sealing gasket ring preferably of the resilient O-ring type 21, both of the O-rings serving as sealing members, with the additional advantage that the first ring also serves as a wiper for any dirt on the stub.

Intermediate the external shoulder 15 and the adjacent end of the female body member the neck portion 12 has mounted therein a pair of radially extended lugs or pins, one being a stop pin 22 and the other a lock pin 23. The pins are preferably spaced circumferentially at 180 degrees, and in longitudinally stepped relation to the axis, that is, lock pin 23 is closer to the external shoulder 15 than the stop pin 22, the purpose of the pins being further described.

Complemental to the skirt portion 11 of the cylindrically tubular female body member 10 there is provided a generally cylindrical tubular male member indicated 24 having a base end portion 25 having any suitable means, such as internal threads 26, for attaching to a conduit member which is to be coupled to the female member. The base end portion of the male member is preferably of substantially the same outer diameter as the external diameter of the skirt of the female body member and may be provided with flat areas 27 whereby it may be tightened with suitable tool upon a connected conduit.

Extending from the base end portion of the male member is a cylindrical tubular stub 28, the relative diameters of stub and base providing an annular shoulder 29 therebetween. The inner diameter of the stub bore is substantially the same as the inner diameter of the neck 12 and the outer diameter of the stub is substantially similar to the inner diameter of the cylindrical bore of the skirt portion of the female member, so that the stub is snugly slidable into said bore and is also rotatable therein, though free rotation is resisted by the circular sealing gaskets 21 bearing upon the wall of the stub. The axial length of the stub from the shoulder 29 to its opposite end is preferably a trifle less than the length of the tubular skirt portion of the female member in which it is inserted whereby, when the shoulder 29 of the male stub contacts the end 16 of the female member, a space 30 is provided between the end of the stub and the internal shoulder 14 of the female member, so that the stub may not be hindered from seating in the event that it may become damaged or burred or have thereon adhering particles of dirt. Preferably the external diameter of the shoulder 29 of the stub is no greater, and preferably similar, to the external diameter of the adjacent end of the female member so that a locking sleeve may slide thereover, as will be described.

Adjacently spaced from the shoulder 29 the exterior wall of the stub has a circumferential annular groove 31 concave in cross section which, when the stub is fully inserted, is confrontingly opposed to the inner openings of the perforations of the ball sockets 17, for purposes of locking the stub in the bore of the female member, in a manner to be described.

Means are provided for selectively locking and releasing the inter-engagement of the male and female members, and as herein exemplified, comprises an elongated generally cylindrical retainer sleeve indicated 32 mounted circumferentially of the exterior wall of the skirt portion of the female member, such sleeve having an inner diameter whereby it is snugly slidable and rotatable upon the femal member and being of axial length whereby one of its ends may override beyond the external shoulder 15 of the female member, while its opposite end overlaps or overrides the ball sockets 17. At its end which overrides said external shoulder the sleeve has a radially inturned annular flange adapted to seat on said external shoulder, said flange having therethrough an axially longitudinal slot 34 having a width of opening to receive therein the most nearly adjacent lock pin 23 which enters the slot by sliding of the sleeve towards the said lock pin when the slod and pin are in longitudinal alignment. The lock pin is positioned to have close slidable clearance with the adjacent end of the sleeve when the flange 33 is in contact with the external shoulder 15, whereby the sleeve may be rotated when the flange is so seated and thus move the slot 34 out of alignment with the lock pin 23, whereby the sleeve is locked against movement of the flange 33 from its seat on the external shoulder. Yet it is also desired that the sliding of the sleeve be limited to the distance necessary to engage the lock pin 23 in the slot and not move therebeyond, wherefore, when the pin 23 is in slot 34 the outer face of the flange engages against the stop pin 22, thus limiting the further movement of the sleeve in that direction.

Adjacent the opposite end of sleeve 32 it is provided with an internal annular concave groove 35 which, when the flange 33 is seated on the external shoulder 15 is out of register beyond the socket 17 holding the balls 19, but which slides into register with the opening of the ball socket 17 when the sleeve is moved axially to engage the lock pin 23 in the slot 34.

In contemplation that the coupling may at times be employed between two flexible hose members which may be dragged, it is not desirable that the sleeve shall be freely slidable longitudinally or freely rotatable in its mounting but shall have a constant yielding resistance as a brake against such free movement, wherefore a frictional brake means is provided between the sleeve and the opposed wall of the female member upon which it rides to yieldingly resist free longitudinal movement and rotation of the sleeve. Such frictional brake means comprises a resilient ring gasket 36 preferably of the O-ring type disposed in an annular groove 37 spaced intermediate the concave groove 35 and the inward flange 33, preferably more nearly the latter.

The external shoulder 15 of the female body member is of greater diameter than the opening of the flange 33 and it is therefore desirable that the parts be assembled by first inserting the neck 12 through the opposite end of the locking sleeve until the external shoulder 15 of the female body contacts the inturned flange 33 and the stop pin 22 and lock pin 23 are slid through the slot 34.

Since the connecting end of the neck 12 is to be tightly secured to a conduit, flat areas for engagement by a wrench may be provided at the exterior of the neck similar to flat areas 27 on the base portion of the male member. However, since the body material of the neck is normally thinner than the said base member, it is preferred to provide adjacent its terminal end an annular nut collar 38 as a separate member and mounted on the neck by set screws 39 to rotate the female member therewith in securing it to a conduit. If desired, this collar may also serve as a stop member for the sliding of the locking sleeve by placing its face at the same position of the stop pin 22, in which event the stop pin may be eliminated. It is preferred, however, to employ both the collar and the stop pin, since in dragging the connected conduits and couplings around, ice or mud may cake between the adjacent face of the lock sleeve and the base of the collar, which might interfere with normal sliding of the sleeve, whereas the relatively small facial area of the stop pin would break through such caked material upon pressure of the sleeve thereagainst; further, even if both pins are employed it is still preferred to employ the collar since its larger diameter and rugged construction shields the end of the neck from damage and its outer diameter extends beyond both the stop pin and the lock pin, thus preventing damage to the pins.

In the modification of Fig. 6 a check valve is included to cut off flow automatically when the coupling members are disconnected, in which case it may be desirable in the exemplified form to lengthen the neck portion 12 of the female member to some extent to provide a chamber 40 for a check valve. A conical face ring shoulder 41 provides a valve seat at the pressure side of the ring shoulder and a ball check valve 42 is seated thereon, a pin 43 transversely of the diameter of the neck confining the ball against movement out of the chamber of the valve portion of the neck. The terminal end of the male stub is provided with a crossbar 44 which, when the stub is inserted past the sealing rings 21, lifts the ball from its seat and permits flow of fluid past the valve and through the coupled conduit. Upon removal of the stub the ball check reseats responsive to the fluid pressure of the line, though, if desired, the ball may be lightly spring loaded to its seat in a well known manner. Any suitable conventional type of check valve may be employed as a matter of choice, many of which are well known.

A suitable internal shoulder 45 may be provided in both the male and female members against which the coupled conduit facilities may abut, so that inner diameter of conduit and coupling may correspond. The coupled conduits may be any type such as hoses, rigid pipes, a nozzle, tool or any other conduit facility which it is desired to releasably couple by the coupling, or any interchange of different kinds of conduit members.

With the foregoing description, it is believed that the operation may be set forth briefly. Assuming the ring gaskets 21 and 36 to be mounted in their respective grooves and the lock balls 19 mounted in the sockets 17, the female member is inserted through one end of the sleeve, said member being relatively rotated to pass both stop pin and lock pin through the slot 34, whereupon the external shoulder of the female member engages the inturned flange 33 of the sleeve. The end collar nut 38 may then be mounted on the neck. When the lock pin 23 is beyond the end of the sleeve and the sleeve flange contacts the external shoulder 33, the sleeve is in locking position and the annular concaved groove or race of the sleeve is out of register below the opening of the ball sockets. Therefore, the balls which are of larger diameter than the depth of the sockets, have the opposite face thereof pressed through the perforations of sockets 17 by the cylindrical inner tubular wall of the sleeve and thus protrude into the tubular bore of the skirt of the female member.

Since the stub member is snugly slidable in the female member, obviously it cannot pass the inwardly protruding portion of the balls. In order to insert or remove the stub, the lock sleeve 32 is rotated until the lock pin 23 is aligned with the slot 34, whereupon the lock sleeve may be slid longitudinally towards the stop pin 22 or the collar 35, whichever is used as the stop member.

At the "stop" position the concaved groove 35 of the sleeve registers with the openings of the ball sockets, thus in effect enlarging the ball sockets, whereby the balls may partially roll into the concaved groove of the sleeve and are thereby loosely disposed in the socket. This is the unlocked position, and the stub 28 may then be inserted readily into the cylindrical bore of the skirt portion until the shoulder of its base portion contacts the end of the skirt of the female member, at which position its opposite end is slightly spaced from the internal shoulder 14 for purposes previously stated. The circular gaskets 21 or O-rings seal against the wall of the stub to prevent leakage in a manner which is well understood in such sealing gaskets, the gaskets being resilient so that they seal resiliently and permit the stub to rotate or swivel on its axis therein. When thus inserted, the stub may readily by-pass the lock balls by pushing them radially outward toward and partially into the annular groove of the sleeve.

When the stub is thus inserted, the lock sleeve is moved longitudinally oppositely to the stop pin or stop collar, as the case may be, until its further longitudinal movement is stopped by the flange 33 contacting shoulder 15. Such movement obviously removes the lock pin 23 from slot 34 and spaces the annular concaved groove 35 out of register below the opening of the sockets 17 the balls being thereby pushed by the inner wall of the sleeve completely into the sockets, and the opposite side of the balls protrude through the opposite perforated opening of the socket and into the bore of the female member and lodging in the annular concaved groove 31 in the stub member, whereupon the stub member is locked against longitudinal movement but may still be axially rotated, since the anti-friction ball bearings 19 not only lock the members longitudinally but also facilitate relative rotation thereof since it is a locking means which eliminates any relative dragging between the rotated members.

The parts being thus locked relatively, the lock sleeve may be axially rotated to turn the slot 34 out of registered alignment with the lock pin, whereby the inturned sleeve flange is held between the shoulder 15 and the lock pin against longitudinal movement, thus maintaining the two coupling members lockingly inter-engaged and securely and releasably locked, yet providing for relative swivel rotation therebetween, the resilient friction brake of the pressure by the O-ring gasket 36 between the exterior of the female body and the lock sleeve thus preventing casual rotation or longitudinal sliding of the lock sleeve into a position where it might inadvertently permit the members to become unlocked. Obviously, to again release the locked engagement, the lock sleeve may be manually rotated until the lock pin 23 is in alignment with slot 34, and the sleeve moved longitudinally until contacting the stop member whereupon the groove 35 registers with socket 17, and thus loosely disposes the lock balls, whereupon the stub may be removed.

Having described the invention, what is claimed to be new and patentable is:

1. A lockable swivel conduit coupling device comprising a tubular female member having at one end an internally cylindrical skirt portion having an open end for receiving therein a male stub member and having an extended neck portion at the opposite end thereof, the skirt being of greater external and internal diameters than the neck providing an internal shoulder and an external shoulder intermediate the axial length of the female member, a lock lug extending radially from the neck in spaced relation to said external shoulder, said skirt having socket openings transversely through the wall thereof adjacently spaced from its said open end, detent balls mounted in said socket openings, the balls being of greater diameter than the thickness of the skirt wall, a tubular male member having a base portion and a cylindrical neck portion of relatively different external diameters providing an external stub shoulder intermediate the ends of said male member of a diameter substantially equal to the external diameter of the open end of the skirt, said stub being substantially equal in length to the internal length of the skirt and being insertable into the bore of the skirt of the female member and snugly rotatable therein, said stub having an external annular groove therein spaced from the stub shoulder substantially the same distance that the socket openings are spaced from the open end of the skirt, said groove registering with the socket openings in the skirt when the open end of the skirt is seated on the external stub shoulder, resilient gasket sealing means mounted in grooves in the inner cylindrical wall of the skirt, said sealing means being spaced intermediately between said internal shoulder and said sockets for providing a seal between the opposed cylindrical walls of the skirt of the female member and the stub of the male member, a locking sleeve mounted longitudinally snugly slidable and rotatable circumferentially of the female member, said sleeve being slidable for contacting said detent balls and selectively moving them radially in said socket openings for locking and unlocking the inter-engagement of the stub with the skirt of the female member, said sleeve having a radially inturned flange for seating on the external shoulder of the skirt, said flange being rotatable between said shoulder and the locking lug when said flange is so seated, the said flange having a slot therein for receiving the lock lug upon longitudinal sliding of the locking sleeve, and a brake means between the opposed cylindrical walls of the locking sleeve and the skirt of the female member for resisting casual longitudinal and rotative movement of said sleeve, said brake means comprising an annular groove in the inner cylindrical wall of the locking sleeve and a resilient ring gasket in said groove, said gasket having resilient sliding contact with the outer wall of the skirt of the female member.

2. A swivel coupling device of the character described having the elements of claim 1 and in which the skirt of the seated female member and the base portion of the stub member are of substantially the same external diameter at said seat of the stub shoulder whereby the locking sleeve may slide longitudinally over said seat, the lock sleeve member having an internal annular groove adjacently spaced from its end adjacent said seat and adapted for moving into register with the balls of the socket openings of the skirt upon longitudinal sliding of the sleeve, whereby the detent balls may move radially outwardly into said groove and release the locked engagement of the stub and skirt.

References Cited in the file of this patent

UNITED STATES PATENTS

| | | |
|---|---|---|
| 1,322,357 | Seng | Nov. 18, 1919 |
| 2,147,835 | Fine | Feb. 21, 1939 |
| 2,386,270 | Samiran | Oct. 9, 1945 |
| 2,461,699 | Scheiwer | Feb. 15, 1949 |
| 2,509,444 | Mitchell | May 30, 1950 |
| 2,514,167 | Scott | July 4, 1950 |
| 2,516,758 | Davis | July 25, 1950 |
| 2,565,572 | Pamgborn | Aug. 28, 1951 |

FOREIGN PATENTS

| | | |
|---|---|---|
| 576,437 | Great Britain | Apr. 3, 1946 |